Dec. 1, 1931.    G. C. OXER    1,834,497
DRYING
Filed April 7, 1923    3 Sheets-Sheet 1
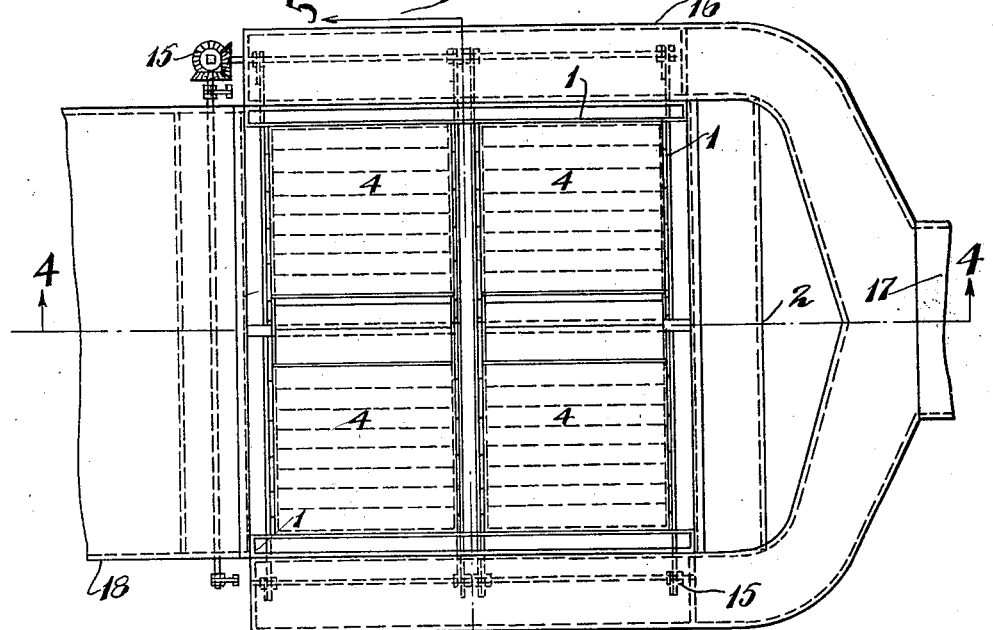
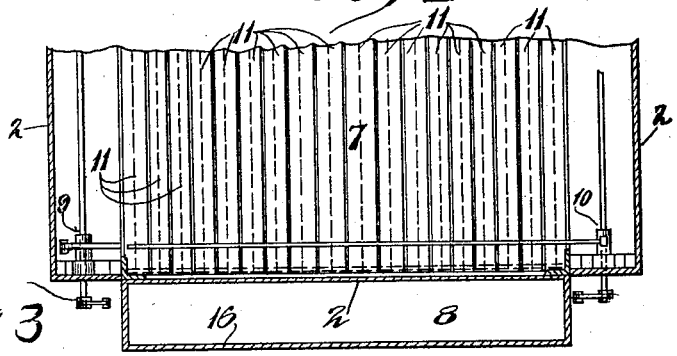
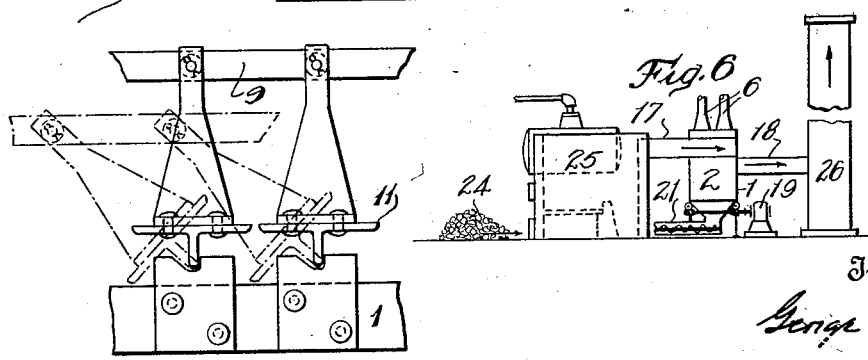
Inventor
George C. Oxer Dec. 1, 1931.  G. C. OXER  1,834,497
DRYING
Filed April 7, 1923   3 Sheets-Sheet 2

Inventor
George C. Oxer

Dec. 1, 1931.  G. C. OXER  1,834,497
DRYING
Filed April 7, 1923  3 Sheets-Sheet 3

Inventor
George C. Oxer

Patented Dec. 1, 1931

1,834,497

UNITED STATES PATENT OFFICE

GEORGE C. OXER, OF READING, PENNSYLVANIA, ASSIGNOR TO FOSTER WHEELER CORPORATION, OF NEW YORK, N. Y., A CORPORATION OF NEW YORK

DRYING

Application filed April 7, 1923. Serial No. 630,614.

My invention relates to improvements in drying including a new form of dryer, for the purpose of driving out, or removing all, or some part of the water, or volatile content, of a material.

It is to be used principally in connection with the removing of all or some part of the moisture contained in coal, lignite or peat, prior to its use as fuel; or the removing of all or some part of the moisture contained in minerals, ores, or solid chemical materials prior to subjecting them to a further process. Certain of my improvements may also be used in connection with any process where it is desired to remove in gaseous state, a volatile substance contained in a solid material that is less volatile.

My dryer, in its preferred form, consists of a number of metal dumping platforms or stages, mounted in parallel planes one above the other, the whole being enclosed by a metal casing or shell and supported by a suitable structure. Baffles are placed between the enclosing case and the dumping platforms at one end of each dumping platform or stage, in such a manner that the hot gases entering at the bottom of the enclosing case or shell, below the last dumping platform, pass upward going forward then backward through each successive space between the dumping platforms, and out near the top of the enclosing case or shell, when maximum drying effect is desired.

Each of the dumping platforms or stages is composed of a number of parallel metal bars, so arranged and connected mechanically that all of the bars of one dumping platform can be rocked or tilted simultaneously creating an opening between adjacent bars, thus passing solely by gravity, the materials contained thereon, to the next dumping platform below, and through the stream of hot gases between. Alternate dumping platforms are joined together in such a manner that they may be operated simultaneously by a single mechanism, but anyone or more of dumping platforms may be disconnected and remain at the open position when less drying effect is desired.

The hot gases employed, are either preheated in a special combustion chamber, or, are waste gases from some nearby process involving combustion, as flue gases from a steam boiler installation in which case the dryer is inserted in the flue system and the gas volume controlled by dampers.

In order that some of the heat contained in the hot gases may be transferred to the interior of the dryer prior to their entrance therein, ducts are provided on two opposite sides of the dryer through which the gases pass in order to gain entrance to the dryer at the bottom. The passage of the stream of hot gases through the dryer may be effected by either natural draft, or a power driven fan.

The materials to be dried, are inserted at the top of the dryer by a suitable chute or feeder, which distributes them over the first dumping platform or stage, thereafter being successively dumped from one dumping platform to the next lower, through the moving stream of hot gases between, and finally, after passing the last dumping platform, are passed out through a suitable hopper bottom, in such a state of dryness as desired.

My invention will be best understood by referring to the accompanying drawings which shows a preferred embodiment thereof, in which:

Figure 1 is a plan view of the top of the dryer.

Figure 2 is a partial cross section of the dryer, showing a dumping platform in plan view.

Figure 3 shows a typical detail of the tilting bars.

Fig. 6 is a diagrammatic illustration showing the connections from the dryer to the boiler installation and stack.

Similar numerals refer to similar parts throughout.

Figure 4:
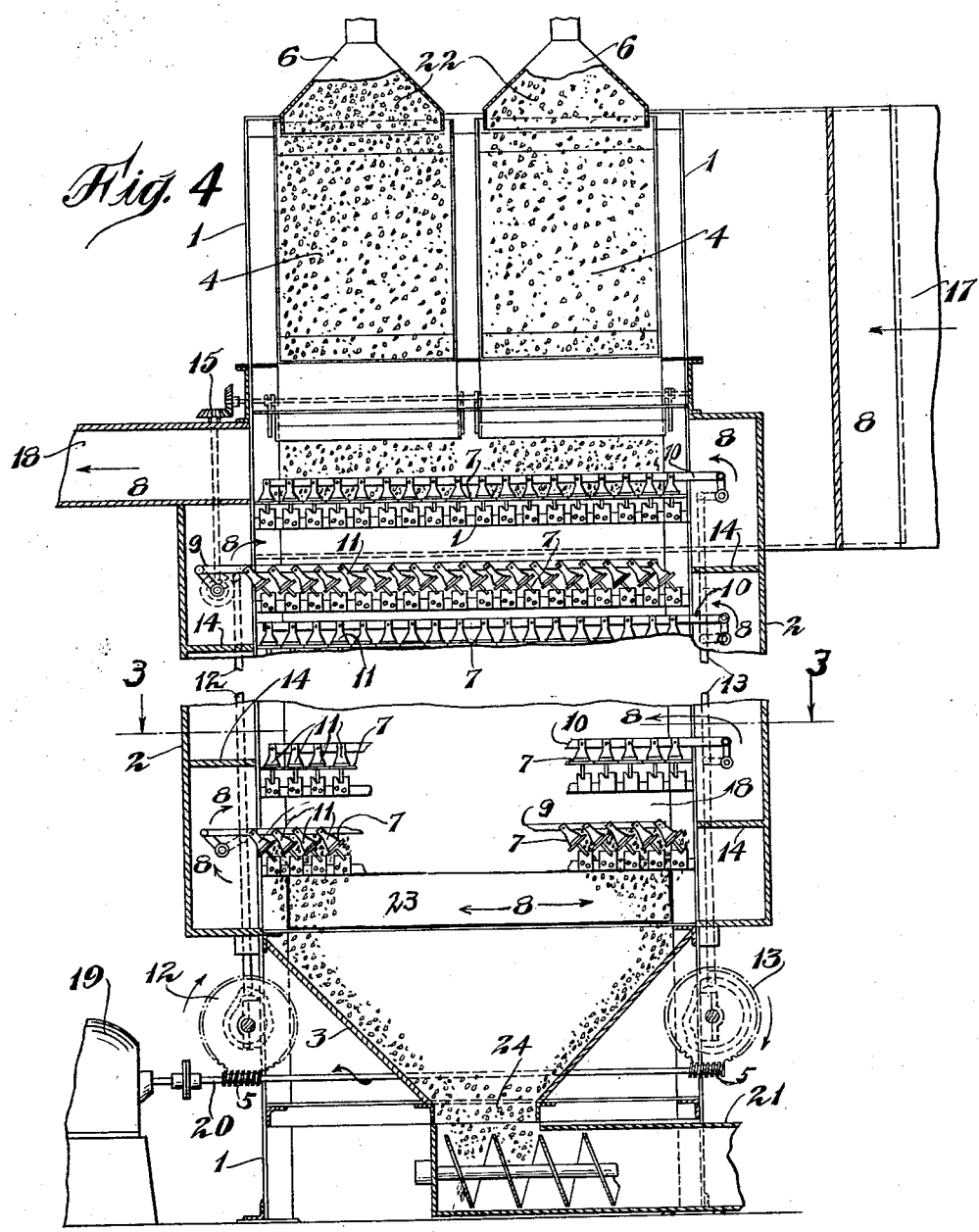
Figure 4 is an elevation showing the dryer in vertical section.
Figure 5:
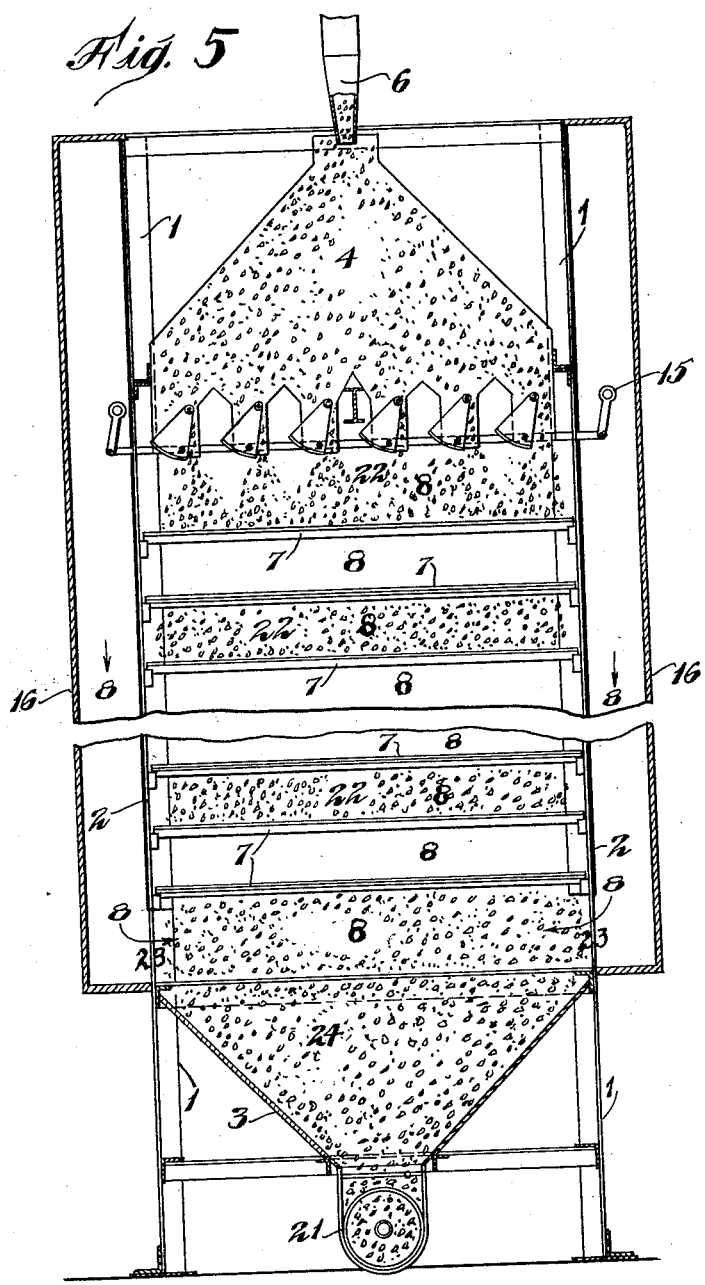
Figure 5 is a sectional elevation of the dryer, at right angles to that shown in Figure 4.

The dryer consists of a supporting framework 1, enclosed on four sides by casing 2, a suitable hopper bottom 3 from which the dried materials 24 are drawn, and a suitable feed chamber 4, into which the materials 22 to be dried are emptied, by suitable spouts 6.

Supported by framework 1 are a number of dumping platforms or stages 7 by which the materials 22 are passed successively through the stream of hot gases 8. Each of the dumping platforms 7 is constructed of a number of parallel bars 11, so carried by the supporting framework 1, that they may be rotated or tilted at an angle from the vertical. Operating mechanisms 9 and 10 are connected respectively to all of the bars 11 of alternate dumping platforms 7 in such a manner that when actuated by their respective driving mechanisms 12 and 13, one set of dumping platforms 7 will be in the horizontal position while the alternate set of dumping platforms 7 will be in the rotated or tilted position, thus passing the materials 22 slowly through the stream of hot gases 8 by the force of gravity, the dumping platforms 7 which are in the horizontal position retaining the materials 22 thereon, until all of the materials 22 have passed from the bars 11 of the dumping platform 7 which is in the rotated or tilted position.

Baffles 14, are so placed between one end of dumping platforms 7 and the enclosing casing 2, that the streams of hot gases entering at the bottom of the dryer through openings 23, are caused to pass forward and backward successively through the spaces between dumping platforms 7, in their course upward through the dryer. By disconnecting one or more of the operating mechanisms 9, or operating mechanisms 10, from their respective driving mechanism 12 or driving mechanism 13, the bars 11 of the dumping platforms 7, thus disconnected, will remain in the rotated or tilted position, thus permitting the stream of hot gases 8 to pass upward through the tilted bars 11, of the disconnected dumping platforms 7, decreasing the distance of travel of the stream of hot gases 8, at the same time permitting the materials 22 to pass downward through the dumping platforms 7, the bars 11 of which are in the rotated or tilted position. This permits regulation of the time of complete passage of the materials 22, through the dryer, and consequently the time in which the materials 22 are in contact with the stream of hot gases 8, thus affording control over the amount of moisture or volatile matter to be extracted from the materials 22.

The feeders at the bottom of feed chamber 4, are caused to operate in unison with the dumping platforms 7, by means of a suitable mechanism 15 connected to driving mechanism 12 so that, when the top dumping platform 7 is in the upright position a charge of materials 22 is deposited thereon, and when the top dumping platform 7 is in the rotated or tilted position, no materials 22 pass from the feed chamber 4.

When desirable, as for example, when the temperature of the incoming stream of hot gases 8, is too high for contact with the dried materials 24 passing from the last dumping platform 7, a part of the heat contained in the hot gases 8 may be utilized in the dryer, by passing the stream of hot gases 8, along one or two sides of the dryer, and in contact with casing 2, by means of the ducts 16.

The stream of hot gases 8, enters the ducts 16, by means of the supply duct 17, which duct 17 may be the flue leading from a boiler installation 25, passes into the dryer through openings 23, through the dryer, and out through a suitable exit duct 18, which exit duct 18 may be the flue leading to the chimney or stack of the boiler installation.

The driving mechanisms 12 and 13 are actuated by a suitable driving shaft 20, equipped with suitable driving gears 5, the driving shaft 20 being connected to a suitable source of power 19.

The dry materials 24 are carried away by any suitable means 21.

My dryer has the advantages that solid materials of any degree of fineness, may be passed through and dried; that it may be connected directly to the flues conducting heated waste gases away from a process; as for example, directly in the draft system of a boiler installation; that it is stationary and occupies a relatively small base area; that the distance traversed by the hot gases in contact with the materials, can be controlled within the dryer; that heat may be absorbed from the hot gases and utilized in the dryer, prior to their contact with the materials to be dried; that the dryer can be operated to dry materials containing various percentages of moisture or volatile matter, with the temperature of the entering hot gases remaining practically constant, and that the power required to operate the dryer is small. It will be apparent that, with my improvements, in the drying of fuel, all or substantially all of the waste gases of combustion from the combustion chamber pass through the drying apparatus to dry the fuel to be used in the combustion chamber, and at the same time the flue system is not clogged to interfere with the passage of the waste gases from the combustion chamber to the stack. The spaces between the dumping platforms 7 through which the hot gases 8 pass, are so large in cross-section and the operation is such that the insertion of the drying apparatus in the flue system does not materially reduce the cross-sectional area of the flue. It has been suggested that some bodies of divided material may be dried by substantially filing a container therewith and passing hot gas through the material in the container, the dried material being withdrawn slowly from the bottom of the container and fresh material to be dried being added at the top of the container whereby the material slowly sinks by gravity through the container. In such case, however, the material substantially fills the container and forms a serious impediment to the passage of the gas therethrough. As distinguished from this, in my method, the fuel to be dried falls freely through the current of hot gases, and does not materially obstruct the passage of the hot gases. The spaces between all the floors 7, do not become completely filled with the material to be dried.

It will also be seen from the above that I have provided a simple and efficient method of drying fuel to be used in a steam boiler or other installation having combustion apparatus whereby the fuel to be burned therein is effectively dried by freely dropping the fuel in separated batches and in successive stages through the hot waste gases of combustion therefrom and thereafter burned in said installation. While I have described my improvements in great detail and with respect to a preferred form thereof, I do not desire to be limited to such form or details since many changes and modifications may be made and the invention embodied in widely different forms without departing from the spirit and scope thereof in its broader aspects. Hence I desire to cover all forms, modifications and arrangements coming within the language or scope of any one or more of the appended claims.

What I claim as new, and desire to secure, by Letters Patent of the United States of America, is:

1. In a dryer the combination of a casing, a plurality of horizontal dumping platforms disposed in the casing one above another in two vertical series, the members of which are alternately arranged, each platform comprising a plurality of tilting bars operatively connected together, means for simultaneously actuating the platforms of each series in alternation with those of the other series to cause them to dump, means for discharging material to be dried upon the uppermost platform, said means being operative only when the bars of said platform are in the closed position, and means for conducting hot gases upwardly between the platforms in a zig zag path.

2. In a dryer the combination of a casing, a plurality of horizontal dumping platforms arranged one above another in the casing, each platform consisting of a plurality of tilting bars operatively connected together, means connected with alternate platforms for simultaneously actuating the bars of all these platforms, means operated by one of these actuating means for discharging material to be dried upon the uppermost platform when the latter is in the closed position, and means for passing gases between all the platforms in a zig zag path, this means including baffles located at the opposite ends of alternate platforms.

3. In a dryer the combination of a casing, a plurality of horizontal dumping platforms disposed in the casing, one above another, each platform comprising a plurality of tiltable bars operatively connected together, means for simultaneously actuating the platforms in two series, the platforms of one series alternating with those of the other, means for discharging the material to be dried upon the uppermost platform, said discharging means being operatively connected with one of said actuating means and being brought into operation when the bars of the uppermost platform are in the closed position, and means for leading heated gases downwardly around the outside of the casing and then upwardly between the platforms in a zig zag path, said last mentioned means including ducts located in the casing at both ends of the platforms and baffles associated with the platforms and located alternately at opposite sides thereof.

4. In a dryer the combination of a casing, a plurality of horizontal dumping platforms disposed in the casing one above another in two vertical series with the platforms of one series alternating with those of the other series, each platform consisting of a plurality of tiltable bars, means for simultaneously actuating all the platforms of each series, said actuating means being operable in alternation and the said platforms being disconnectable from said means at will, means for discharging material to be dried upon the uppermost platform, said discharging means being operable by one of said actuating means and being brought into action when the bars of the uppermost platform are in the closed position, and means for leading hot gases between the platforms upwardly in a zig zag path.

5. In a dryer the combination of a casing, a plurality of horizontal dumping platforms disposed in the casing one above another, means for dumping the platforms in two series, the platforms of one series being in alternation with those of the other, means for rendering the dumping means inoperative at will with respect to selected platforms, means for discharging material to be dried upon the uppermost platform, said discharging means being operative only when the said platform is in the closed position, means for withdrawing the dried material from the casing below the lowermost platform, and means for conducting heated gases upwardly through the casing in a zig zag path between the platforms.

6. In a dryer the combination of a casing, a plurality of horizontal dumping platforms disposed in the casing one above another, each platform consisting of a plurality of tiltable bars operatively connected together, a pair of arms reciprocating in alternation, means for operatively connecting the bars of alternate platforms to the arms, said connecting means being rendered inoperable at will with respect to selected platforms, means for feeding material to be dried to the uppermost platform, this means including a plurality of tiltable bars and being operated by one of said arms whenever the bars of the uppermost platform are in the closed position, ducts located along the sides of the casing for leading hot gases into the bottom thereof, baffles for directing the gases upwardly between the platforms in a zig zag path, and means for withdrawing the dried material from the bottom of the casing.

7. In a dryer the combination of a casing, a plurality of dumping platforms disposed horizontally thereon, one above another, means for discharging material to be dried upon the uppermost platform, means for simultaneously dumping alternate platforms, means for conducting heated gases between the platforms successively in a zig zag path, and means whereby one or more of the platforms may be maintained in dumping position to alter the length of the path of travel of these gases.

8. In a dryer the combination of a casing, a plurality of horizontal dumping platforms disposed in the casing one above another, means for discharging material to be dried upon the uppermost platform, means for simultaneously dumping alternate platforms, means for conducting heated gases between the platforms successively in a zig zag path, and means for varying the length of said gas path by maintaining a selected platform in the dumped position.

Signed at Reading, in the county of Berks and State of Pennsylvania, this 6th day of March A. D. 1923.

GEORGE C. OXER.